(12) United States Patent
Veilleux et al.

(10) Patent No.: US 11,945,506 B2
(45) Date of Patent: Apr. 2, 2024

(54) LIGHT-WEIGHT BEAM ASSEMBLY AND TRUCK TRAILER USING THE SAME

(71) Applicant: MANAC INC., Saint-Georges (CA)

(72) Inventors: Guy Veilleux, Saint-Georges (CA); Guillaume Samson, Saint-Georges (CA)

(73) Assignee: MANAC INC., Saint-Georges (CA)

( * ) Notice: Subject to any disclaimer, the term of this patent is extended or adjusted under 35 U.S.C. 154(b) by 86 days.

(21) Appl. No.: 17/519,190

(22) Filed: Nov. 4, 2021

(65) Prior Publication Data
US 2022/0135137 A1 May 5, 2022

Related U.S. Application Data

(60) Provisional application No. 63/109,763, filed on Nov. 4, 2020.

(51) Int. Cl.
| | |
|---|---|
| *B62D 21/20* | (2006.01) |
| *B62D 29/00* | (2006.01) |
| *B62D 63/06* | (2006.01) |
| *B61D 17/00* | (2006.01) |
| *B62D 21/00* | (2006.01) |

(Continued)

(52) U.S. Cl.
CPC ........... *B62D 21/20* (2013.01); *B62D 29/007* (2013.01); *B62D 29/008* (2013.01); *B62D 63/06* (2013.01); *B61D 17/00* (2013.01); *B62D 21/00* (2013.01); *B62D 21/02* (2013.01); *B62D 21/03* (2013.01); *B62D 21/08* (2013.01); *B62D 29/001* (2013.01);

(Continued)

(58) Field of Classification Search
CPC ........ B62D 21/00; B62D 21/02; B62D 21/03; B62D 21/08; B62D 21/20; B62D 29/001; B62D 29/007; B62D 29/008; B62D 53/00; B62D 53/04; B62D 53/06; B62D 63/06; B62D 33/00; B62D 33/02; B61D 17/00
USPC ................. 296/184.1, 204; 280/79, 781, 799
See application file for complete search history.

(56) References Cited

U.S. PATENT DOCUMENTS

| | | | | |
|---|---|---|---|---|
| 2,052,535 A | * | 8/1936 | Sherman | ................ B62D 21/06 |
| | | | | 280/800 |
| 2,812,192 A | | 11/1957 | Cole | |

(Continued)

FOREIGN PATENT DOCUMENTS

| | | |
|---|---|---|
| CA | 2728040 C | 12/2009 |
| CA | 3141048 A1 | 6/2023 |

(Continued)

OTHER PUBLICATIONS

Ba et al., "Underframe for Platform Trucks, and Platform Trucks", Publisher: WIPO, Edition: WO2021156780A1 published Aug. 12, 2021 (Year: 2021).*

(Continued)

*Primary Examiner* — Amy R Weisberg
*Assistant Examiner* — Dana D Ivey
(74) *Attorney, Agent, or Firm* — Bereskin & Parr LLP/S.E.N.C.R.L., s.r.l.

(57) ABSTRACT

Light-weight beam assembly and truck trailer using the same are disclosed herein. The light-weight beam assembly is a beam being a single unitary continuous piece comprising at least two cutouts cut through, at least one vertically extending supporting member and a plurality of reinforcement members. Two beams may be connected by a plurality of transversal members for use in a truck trailer.

22 Claims, 10 Drawing Sheets

(51) Int. Cl.
*B62D 21/02* (2006.01)
*B62D 21/03* (2006.01)
*B62D 21/08* (2006.01)
*B62D 33/00* (2006.01)
*B62D 33/02* (2006.01)
*B62D 53/00* (2006.01)
*B62D 53/04* (2006.01)

(52) U.S. Cl.
CPC .............. *B62D 33/00* (2013.01); *B62D 33/02* (2013.01); *B62D 53/00* (2013.01); *B62D 53/04* (2013.01)

(56) References Cited

U.S. PATENT DOCUMENTS

| | | | |
|---|---|---|---|
| 4,363,590 A | | 12/1982 | Crate |
| 5,205,587 A | * | 4/1993 | Orr ....................... B62D 27/065 280/789 |
| 5,507,514 A | * | 4/1996 | Jacques ................ B62D 53/067 280/411.1 |
| 7,097,232 B2 | | 8/2006 | Beaudry et al. |
| 7,559,736 B1 | | 7/2009 | Mohan |
| 7,618,227 B2 | | 11/2009 | Smith |
| 7,926,848 B2 | | 4/2011 | Sherbeck et al. |
| 8,075,062 B2 | | 12/2011 | Hicks |
| 8,157,499 B1 | | 4/2012 | Jones |
| 8,167,061 B2 | | 5/2012 | Scheuerman et al. |
| 8,328,140 B2 | | 12/2012 | Nordstrom |
| D695,152 S | | 12/2013 | Duggleby et al. |
| 8,925,951 B2 | | 1/2015 | Bartlett |
| 9,266,676 B2 | | 2/2016 | Pfeiffer et al. |
| 9,718,390 B1 | | 8/2017 | Hadley et al. |
| 9,776,668 B2 | | 10/2017 | Isaksson |
| 9,919,798 B2 | | 3/2018 | Haertel et al. |
| 10,183,606 B2 | | 1/2019 | Schomaker et al. |
| 10,239,436 B2 | | 3/2019 | Oren |
| 10,239,690 B2 | | 3/2019 | Battles et al. |
| 10,322,660 B1 | | 6/2019 | Dermeche |
| 10,449,886 B2 | | 10/2019 | Richardson |
| 10,688,901 B2 | | 6/2020 | Zahr et al. |
| 10,787,108 B2 | | 9/2020 | Vollmering |
| 11,089,730 B2 | | 8/2021 | Canela Sacanell et al. |
| 11,117,630 B2 | | 9/2021 | Plowman |
| 11,208,023 B2 | | 12/2021 | Marble |
| 11,312,284 B2 | | 4/2022 | Sollenlid et al. |
| 11,351,867 B2 | | 6/2022 | Schutt et al. |
| 2004/0070190 A1 | * | 4/2004 | Ridge ..................... B62D 21/02 280/781 |
| 2007/0241587 A1 | * | 10/2007 | Fleming ................. B62D 21/02 296/203.01 |
| 2009/0256399 A1 | * | 10/2009 | Sherbeck ............... B62D 21/02 296/204 |
| 2010/0308639 A1 | | 12/2010 | Cushman |
| 2015/0183361 A1 | | 7/2015 | Bacon |
| 2020/0039415 A1 | | 2/2020 | Bacon |
| 2020/0039557 A1 | | 2/2020 | Burch, V et al. |
| 2021/0178956 A1 | | 6/2021 | Richardson |
| 2021/0276636 A1 | | 9/2021 | Griffee et al. |
| 2021/0387558 A1 | | 12/2021 | Carlson et al. |
| 2022/0162941 A1 | | 5/2022 | Morrison |

FOREIGN PATENT DOCUMENTS

| | | | | |
|---|---|---|---|---|
| CN | 103332223 A | | 10/2013 | |
| CN | 105235578 A | | 1/2016 | |
| CN | 205854276 U | | 1/2017 | |
| CN | 205930900 U | * | 2/2017 | |
| CN | 208585155 | | 3/2019 | |
| CN | 111559402 A | * | 8/2020 | ............... B61D 3/20 |
| CN | 113320608 | | 8/2021 | |
| DE | 202020101117 U1 | * | 4/2020 | ............... B61D 3/20 |
| EP | 3708453 A1 | * | 9/2020 | ............... B61F 1/00 |
| WO | WO-2021156780 A1 | * | 8/2021 | ............... B61D 3/20 |
| WO | 2022015170 | | 1/2022 | |

OTHER PUBLICATIONS

Ba et al., "Subframe for platform trolleys and platform trolleys", Published: Apr. 23, 2020, Publisher: German Patent Office, Edition: DE202020101117U (Year: 2020).*

Huegl et al. "Subframe for Vehicles and Vehicle", Published: Sep. 16, 2020, Publisher: European Patent Office, Edition: EP3708453A1 (Year: 2020).*

Liu et al., "High load-bearing integrated lightweight frame", Published: Feb. 8, 2017, Publisher: Chinese Patent Office, Edition: CN205930900U (Year: 2017).*

Blascheck et al., "Underframe for Platform Trucks, and Platform Trucks", Published: Aug. 12, 2021, Publisher: European Patent Union, Edition: WO/2021/156780 (Year: 2021).*

Yuanyong et al., "Full-riveting modular middle beam structure, flatcar underframe and railway flatcar", Published: May 21, 2020, Publisher: Chinese Patent Office, Edition: CN111559402A (Year: 2020).*

Kaufman Trailers, "14,000 to 18,000 GVWR / 50 ft. Low-Profile Triaxle Wedge Car Trailer" [online], [retrieved on Jan. 11, 2021]. Retrieved from the Internet <URL: https://www.kaufmantrailers.com/car-trailers/wedge-car-haulers/14000-18000-50-low-profile-wedge-car/>.

Mohrbacher, H. et al. "Innovative manufacturing technology enabling light weighting with steel in commercial vehicles", Ad. Manuf., 3:3-18, Mar. 13, 2015.

AL-KO, "New AL-KO Vario X chassis: Impresses with its lightness" [online], [retrieved on Jan. 11, 2021]. Retrieved from the Internet <URL: https://www.alko-tech.com/en/news/2019/new-al-ko-vario-x-chassis-impresses-its-lightness>.

English Translation—Machine Translation of CN113320608B, "Improved semitrailer frame", published on Aug. 31, 2021.

English Translation—Machine Translation of CN208585155U, "Container semitrailer of easily unloading", published on Mar. 8, 2019.

Capral Limited, "Aluminum Products Catalogue", [online][retrieved on Sep. 26, 2023] retrieved from https://www.capral.com.au/wordpress/wp-content/uploads/Capral-Truck-Utility-Trays.pdf, Oct. 2020.

Capral Limited, "Aluminum Transport Sections", [online][retrieved on Sep. 27, 2023] retrieved from https://www.capral.com.au/wordpress/wp-content/uploads/2019/09/Capral-Alum-Products_Catalogue.pdf, Jul. 2021.

* cited by examiner

LIGHT-WEIGHT BEAM ASSEMBLY AND TRUCK TRAILER USING THE SAME

CROSS-REFERENCE TO RELATED APPLICATIONS

The present application claims priority to U.S. 63/109,763 filed on Nov. 4, 2020, that is hereby incorporated by reference in its entirety.

TECHNICAL FIELD

The present disclosure relates generally to light-weight truck trailer and more specifically, to light-weight beam assembly and truck trailer using the same.

BACKGROUND

A trailer is an unpowered vehicle towed by a powered vehicle. Truck trailers, including flatbed trailers, step deck trailers, enclosed box trailers, semi-trailers, and the like, are commonly used to transport various goods and materials. However, truck trailer assemblies are often very heavy.

Most jurisdictions enforce Vehicle Load and Size Limits Regulations, the main purpose being to ensure road user safety and protection of roadways and bridges. Considering these regulations, the heavier the truck trailer assembly, the less merchandise can be transported before reaching the prescribed weight limitations. Providing lighter weight truck trailer assemblies would transpose in the possibility of transporting more merchandise per load. As such, time and cost savings would result from making lighter truck trailer assemblies. Lighter weight would also result in overall energy savings. For example, it would help lowering polluting emissions. This would clearly be beneficial in protecting environment and natural resources.

Accordingly, there is a need for lighter truck trailer assemblies, while retaining the required resistance and stiffness. The present disclosure aims to provide an improved beam assembly, especially for truck trailer, which is relatively lightweight but which can carry the same loads and thereby achieve substantially the same flexural rigidity as previously used beam assembly and truck trailer.

SUMMARY

The present disclosure provides light-weight beam assembly and truck trailer using the same.

Accordingly, the present disclosure includes a light-weight truck trailer comprising: two longitudinal beams, each beam being a single unitary continuous piece comprising at least two cutouts cut through the single unitary continuous piece, wherein each of the cutouts independently extend vertically from an upper portion to a lower portion of the beam and extend longitudinally over a length of the beam, and wherein the at least two cutouts are defined within the single unitary continuous piece by at least one vertically extending supporting member; a plurality of reinforcement members, each reinforcement member being connected to one of the two beams, from one end at the upper portion of the beam and from the other end at the lower portion of the beam so that the reinforcement member extends transversally across one of the cutouts.

In some embodiments, the cutouts each independently have the shape of: an ellipse, a circle, a rectangle, a square, a hexagon, or a pentagon.

In some embodiments, 2, 3, 4, or 5 large cutouts are present.

In some embodiments, a plurality of small cutouts are present.

In some embodiments, at least one of the large cutouts extends longitudinally over a length of the beam, from a point at about ¼ to about ⅓ from the front, to a point at about ½ to about ⅔ from the front.

In some embodiments, at least one of the large cutouts extends longitudinally over a length of the beam, from a point at about ½ to about ⅔ from the front, to a point at about ⅔ to about ¾ from the front.

In some embodiments, at least one of the large cutouts extends longitudinally over a length of the beam, from a point at about ⅕ of the length of the beam from the front, to a point at about ⅓ of the length of the beam from the front.

In some embodiments, at least one of the large cutouts extend longitudinally over a length of the beam, wherein the length is about ⅙ to about ⅖ of the total length of the beam.

In some embodiments, at least one of the large cutouts extend longitudinally over a length of the beam, wherein the length is up to about ¼ of the total length of the beam.

In some embodiments, at least one of the large cutouts extend longitudinally over a length of the beam, wherein the length is up to about ⅙ of the total length of the beam.

In some embodiments, a first cutout extends from a point at about ¼ to about ⅓ of the length of the beam from the front, to a point at about ½ to about ⅔ of the length of the beam from the front, a secondary cutout may extend from a point at about ½ to about ⅔ of the length of the beam from the front, to a point at about ⅔ to about ¾ of the length of the beam from the front and a third cutout may extend from a point at about ⅕ of the length of the beam from the front, to a point at about ⅓ of the length of the beam from the front.

In some embodiments, two reinforcement members overlap at their center to form a x-cross.

In some embodiments, a plurality of x-crosses are formed by reinforcement members over the length of at least one cutout.

In some embodiments, at least one cutout is not associated with reinforcement members.

In some embodiments, the beams are formed of steel or aluminum.

In some embodiments, the at least one vertically extending supporting member defines an I-shape, a T-shape, a X-shape, or a Y-shape.

In some embodiments, the at least one vertically extending supporting member defines an I-shape.

In some embodiments, the at least one vertically extending supporting member is positioned, at its center, at a point at about ⅕ of the length of the beam from the front.

In some embodiments, the at least one vertically extending supporting member is positioned, at its center, at a point at about ¼ to about ⅓ of the length of the beam from the front.

In some embodiments, the at least one vertically extending supporting member is positioned, at its center, at a point at about ½ to about ⅔ of the length of the beam from the front.

In some embodiments, the at least one vertically extending supporting member is positioned, at its center, at a point at about ⅔ to about ¾ of the length of the beam from the front.

In some embodiments, a plurality of vertically extending supporting members are present and are each independently positioned, at their respective center, at a point at about ⅕ of the length of the beam from the front, at a point at about ¼ to about ⅓ of the length of the beam from the front, at a point at about ½ to about ⅔ of the length of the beam from the front, and at a point at about ⅔ to about ¾ of the length of the beam from the front.

In some embodiments, the reinforcement members are made of aluminum, stainless steel, steel, carbon fiber, or fiber glass.

In some embodiments, the configuration of the two beams are identical.

In some embodiments, the truck trailer further comprises a plurality of transversal members, each transversal member being connected: at one end to the upper portion of one of the two beams and at the other end to the upper portion of the other of the two beams, or at one end to the lower portion of one of the two beams and at the other end to the lower portion of the other of the two beams.

In some embodiments, the transversal members are made of aluminum, stainless steel, steel, carbon fiber, fabricated steel member.

In some embodiments, the truck trailer further comprises a platform, an enclosed box, resting on top of the two beams and transversal members.

In some embodiments, the truck trailer further comprises wheel assemblies.

In some embodiments, the total weight reduction of the truck trailer is between 15% and 25%.

In some embodiments, the total weight reduction of the truck trailer is about 20%.

In some embodiments, the total weight of the truck trailer is from 2000 kg about to about 3000 kg.

In some embodiments, the total weight of the truck trailer is from about 2000 kg to about 2800 kg.

In some embodiments, the total weight of the truck trailer is from about 2000 kg to about 2500 kg.

In some embodiments, the total length of the truck trailer is from about 5 m to about 25 m.

In some embodiments, the total length of the truck trailer is from about 10 m to about 18 m.

In some embodiments, the total length of the truck trailer is from about 14 m to about 17 m or about 14.6 m to about 16.2 m.

Figure 5A:
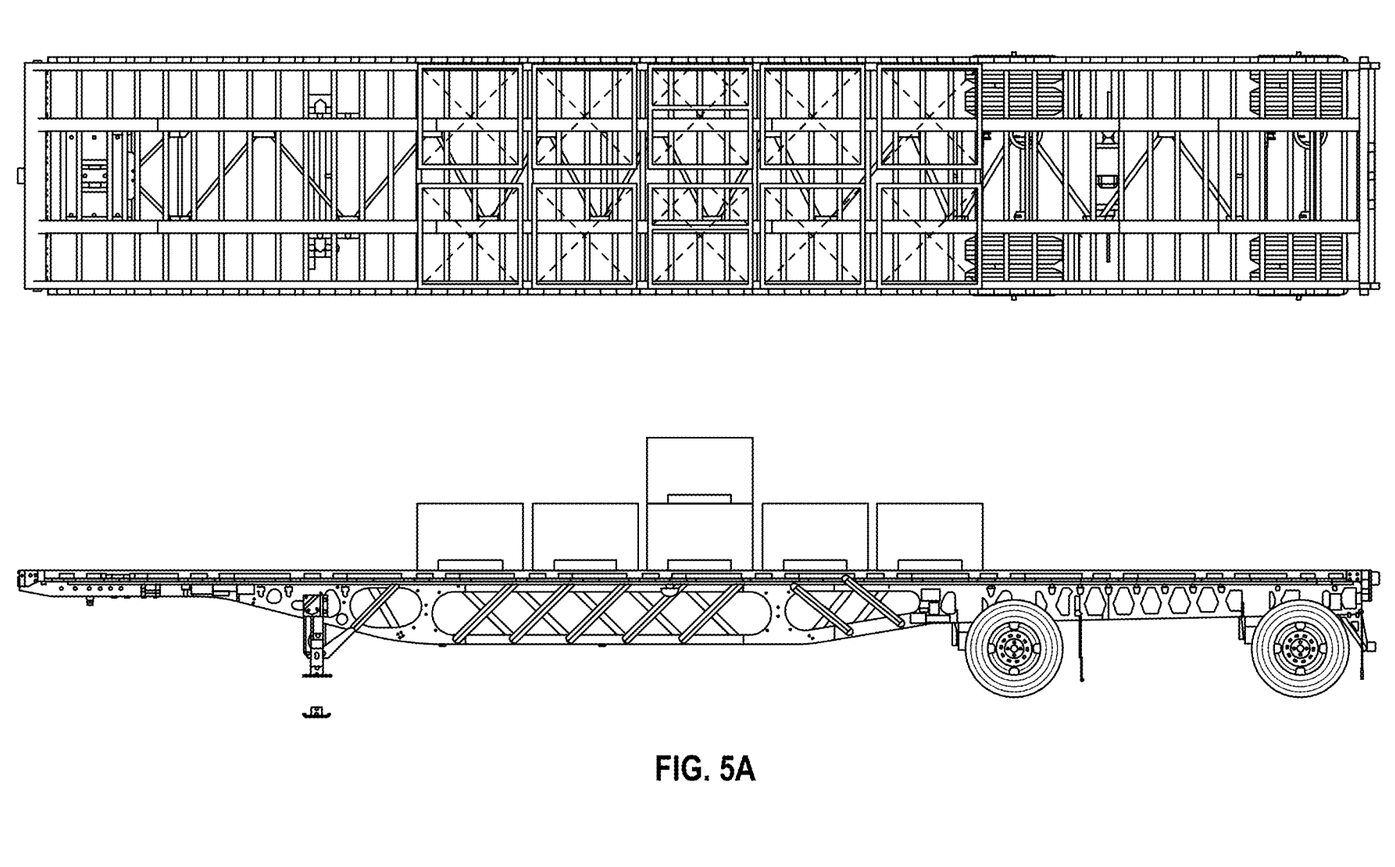
FIGS. 5A, 5B and 5C are illustrations of load distributions for resistance tests.

In some embodiments, the vertical deformation of the beams receiving a load is from about 2% to about 10%, wherein the load is distributed as shown in FIG. 5A.

In some embodiments, the vertical deformation of the beams receiving a load is from about 2% to about 10%, wherein the load is from about 20,000 kg to about 24,000 kg distributed over a length of from about 500 cm to about 750 cm at the center of the beams.

Figure 5B:
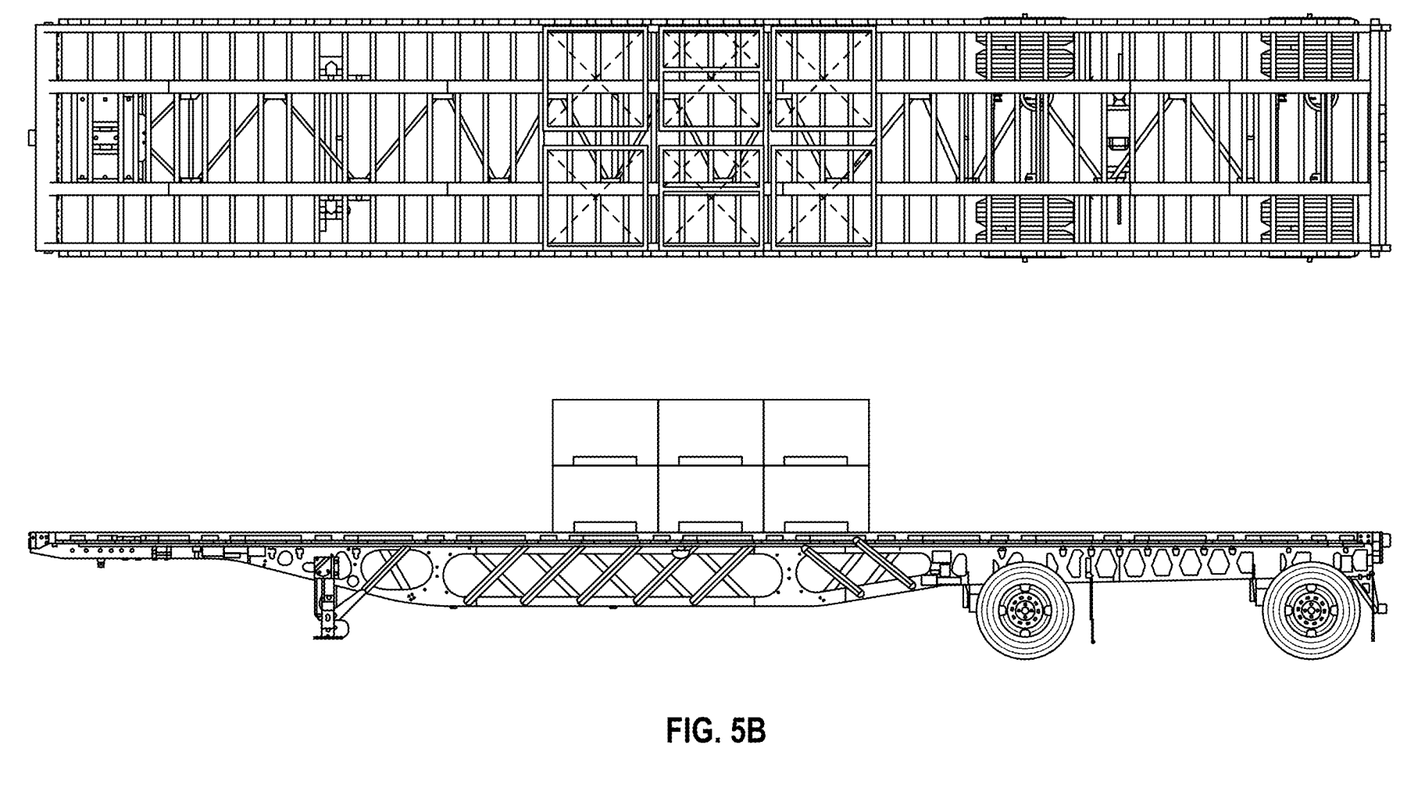

In some embodiments, the vertical deformation of the beams receiving a load is from about 2% to about 10%, wherein the load is distributed as shown in FIG. 5B.

In some embodiments, the vertical deformation of the beams receiving a load is from about 2% to 10%, wherein the load is from about 20,000 kg to about 24,000 kg distributed over a length of from about 275 cm to about 450 cm at the center of the beams.

In some embodiments, the vertical deformation of the beams receiving a load is from about 5% to about 10%, wherein the load is distributed as shown in FIG. 5A.

In some embodiments, the vertical deformation of the beams receiving a load is from about 5% to about 10%, wherein the load is from about 20,000 kg to about 24,000 kg distributed over a length of from about 500 cm to about 750 cm at the center of the beams.

In some embodiments, the vertical deformation of the beams receiving a load is from about 5% to about 10%, wherein the load is distributed as shown in FIG. 5B.

In some embodiments, the vertical deformation of the beams receiving a load is from about 5% to about 10%, wherein the load is from about 20,000 kg to about 24,000 kg distributed over a length of from about 275 cm to about 450 cm at the center of the beams.

In some embodiments, the vertical deformation of the beams receiving a load is from about 5% to about 7%, wherein the load is distributed as shown in FIG. 5A.

In some embodiments, the vertical deformation of the beams receiving a load is from about 5% to about 7%, wherein the load is from about 20,000 kg to about 24,000 kg distributed over a length of from about 500 cm to about 750 cm at the center of the beams.

In some embodiments, the vertical deformation of the beams receiving a load is from about 5% to about 7%, wherein the load is distributed as shown in FIG. 5B.

In some embodiments, the vertical deformation of the beams receiving a load is from about 5% to about 7%, wherein the load is from about 20,000 kg to about 24,000 kg distributed over a length of from about 275 cm to about 450 cm at the center of the beams.

In some embodiments, the vertical deformation of the beams receiving a load is from about 2% to about 10%, wherein the load is distributed over a length from a point at about ¼ of the total length of the truck trailer from the front, to a point at about ¾ of the total length of the truck trailer from the front.

In some embodiments, the vertical deformation of the beams receiving a load is from about 2% to about 10%, wherein the load is distributed over a length from a point at about ⅓ of the total length of the truck trailer from the front, to a point at about ⅔ of the total length of the truck trailer from the front.

In some embodiments, the vertical deformation of the beams receiving a load is from about 5% to about 10%, wherein the load is distributed over a length from a point at about ¼ of the total length of the truck trailer from the front, to a point at about ¾ of the total length of the truck trailer from the front.

In some embodiments, the vertical deformation of the beams receiving a load is from about 5% to about 10%, wherein the load is distributed over a length from a point at about ⅓ of the total length of the truck trailer from the front, to a point at about ⅔ of the total length of the truck trailer from the front.

In some embodiments, the vertical deformation of the beams receiving a load is from about 5% to about 7%, wherein the load is distributed over a length from a point at about ¼ of the total length of the truck trailer from the front, to a point at about ¾ of the total length of the truck trailer from the front.

In some embodiments, the vertical deformation of the beams receiving a load is from about 5% to about 7%, wherein the load is distributed over a length from a point at about ⅓ of the total length of the truck trailer from the front, to a point at about ⅔ of the total length of the truck trailer from the front.

In some embodiments, the load support over the total length of the truck trailer is at least 90%.

The present disclosure also includes a light-weight beam assembly for use in a truck trailer, the assembly comprising: a beam being a single unitary continuous piece comprising at least two cutouts cut through the single unitary continuous piece, wherein the cutouts extend vertically from an upper portion to a lower portion of the beam and extend longitudinally over a length of the beam, and wherein adjacent cutouts are defined within the single unitary continuous piece by at least one vertically extending supporting member; a plurality of reinforcement members, each reinforcement member being connected to the beam, from one end at the upper portion of the beam and from the other end at the lower portion of the beam so that the reinforcement member extends transversally across one of the cutouts.

In some embodiments, the cutouts each independently have the shape of: an ellipse, a circle, a rectangle, a square, a hexagon, or a pentagon.

In some embodiments, 2, 3, 4, or 5 large cutouts are present.

In some embodiments, a plurality of small cutouts are present.

In some embodiments, at least one of the large cutouts extends longitudinally over a length of the beam, from a point at about ¼ to about ⅓ from the front, to a point at about ½ to about ⅔ from the front.

In some embodiments, at least one of the large cutouts extends longitudinally over a length of the beam, from a point at about ½ to about ⅔ from the front, to a point at about ⅔ to about ¾ from the front.

In some embodiments, at least one of the large cutouts extends longitudinally over a length of the beam, from a point at about ⅕ of the length of the beam from the front, to a point at about ⅓ of the length of the beam from the front.

In some embodiments, at least one of the large cutouts extend longitudinally over a length of the beam, wherein the length is about ⅙ to about ⅖ of the total length of the beam.

In some embodiments, at least one of the large cutouts extend longitudinally over a length of the beam, wherein the length is up to about ¼ of the total length of the beam.

In some embodiments, at least one of the large cutouts extend longitudinally over a length of the beam, wherein the length is up to about ⅙ of the total length of the beam.

In some embodiments, a first cutout extends from a point at about ¼ to about ⅓ of the length of the beam from the front, to a point at about ½ to about ⅔ of the length of the beam from the front, a secondary cutout may extend from a point at about ½ to about ⅔ of the length of the beam from the front, to a point at about ⅔ to about ¾ of the length of the beam from the front and a third cutout may extend from a point at about ⅕ of the length of the beam from the front, to a point at about ⅓ of the length of the beam from the front.

In some embodiments, two reinforcement members overlap at their center to form a x-cross.

In some embodiments, a plurality of x-crosses are formed by reinforcement members over the length of at least one cutout.

In some embodiments, at least one cutout is not associated with reinforcement members.

In some embodiments, the beams are formed of steel or aluminum.

In some embodiments, the at least one vertically extending supporting member defines an I-shape, a T-shape, a X-shape, or a Y-shape.

In some embodiments, the at least one vertically extending supporting member defines an I-shape.

In some embodiments, the at least one vertically extending supporting member is positioned, at its center, at a point at about ⅕ of the length of the beam from the front.

In some embodiments, the at least one vertically extending supporting member is positioned, at its center, at a point at about ¼ to about ⅓ of the length of the beam from the front.

In some embodiments, the at least one vertically extending supporting member is positioned, at its center, at a point at about ½ to about ⅔ of the length of the beam from the front.

In some embodiments, the at least one vertically extending supporting member is positioned, at its center, at a point at about ⅔ to about ¾ of the length of the beam from the front.

In some embodiments, a plurality of vertically extending supporting members are present and are each independently positioned, at their respective center, at a point at about ⅕ of the length of the beam from the front, at a point at about ¼ to about ⅓ of the length of the beam from the front, at a point at about ½ to about ⅔ of the length of the beam from the front, and at a point at about ⅔ to about ¾ of the length of the beam from the front.

In some embodiments, the reinforcement members are made of aluminum, stainless steel, steel, carbon fiber, or fiber glass.

In some embodiments, two beams are assembled together and further comprises a plurality of transversal members, each transversal member being connected: at one end to the upper portion of one of the two beams and at the other end to the upper portion of the other of the two beams, or at one end to the lower portion of one of the two beams and at the other end to the lower portion of the other of the two beams.

In some embodiments, the transversal members are made of aluminum, stainless steel, steel, carbon fiber, fabricated steel member.

In some embodiments, the total length of the beam is from about 5 m to about 25 m.

In some embodiments, the total length of the beam is from about 10 m to about 18 m.

In some embodiments, the total length of the beam is from about 14 m to about 17 m, or about 14.6 m to about 16.2 m.

The present disclosure further includes a use of a light-weight beam assembly as defined herein in the manufacture of a truck trailer.

These and other features and advantages of the present application will become apparent from the following detailed description taken together with the accompanying drawings. However, it should be understood that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

The skilled person in the art will understand that the drawings, further described below, are for illustration purposes only. The drawings are not intended to limit the scope of the applicant's teachings in any way. Also, it will be appreciated that for simplicity and clarity of illustration, elements shown in the figures have not necessarily been drawn to scale. For example, the dimensions of some of the elements may be exaggerated relative to other elements for clarity. Further aspects and features of the example embodiments described herein will appear from the following description taken together with the accompanying drawings.

DETAILED DESCRIPTION

To promote an understanding of the principles of the disclosure, reference will now be made to the features illustrated in the drawings and no limitation of the scope of the disclosure is hereby intended. Any alterations and further modifications, and any further applications of the principles of the disclosure as described herein are contemplated as would normally occur to one skilled in the art to which the disclosure relates. For the sake of clarity, some features not relevant to the present disclosure may not be shown in the drawings.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. In the following description and in the claims, the terms "including" and "comprising" are used in an open-ended fashion, and thus, should be interpreted to mean "including, but not limited to."

The articles "the," "a" and "an" are not necessarily limited to mean only one, but rather are inclusive and open ended to include, optionally, multiple such elements.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

"At least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, to at least one, optionally including more than one, A, with no B present (and optionally including entities other than B); to at least one, optionally including more than one, B, with no A present (and optionally including entities other than A); to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

Where two or more ranges are used, such as but not limited to 1 to 5 or 2 to 4, any number between or inclusive of these ranges is implied.

As used herein, the phrases "for example," "as an example," and/or simply the terms "example" or "exemplary," when used with reference to one or more components, features, details, structures, methods and/or figures according to the present disclosure, are intended to convey that the described component, feature, detail, structure, method and/or figure is an illustrative, non-exclusive example of components, features, details, structures, methods and/or figures according to the present disclosure. Thus, the described component, feature, detail, structure, method and/or figure is not intended to be limiting, required, or exclusive/exhaustive; and other components, features, details, structures, methods and/or figures, including structurally and/or functionally similar and/or equivalent components, features, details, structures, methods and/or figures, are also within the scope of the present disclosure. Any embodiment or aspect described herein as "exemplary" is not to be construed as preferred or advantageous over other embodiments.

Herein, light-weight beam assembly and truck trailer using the same are described. The light-weight beam assembly and truck trailer described herein provide for lighter structures, while retaining the required resistance and rigidity.

Figure 1A:
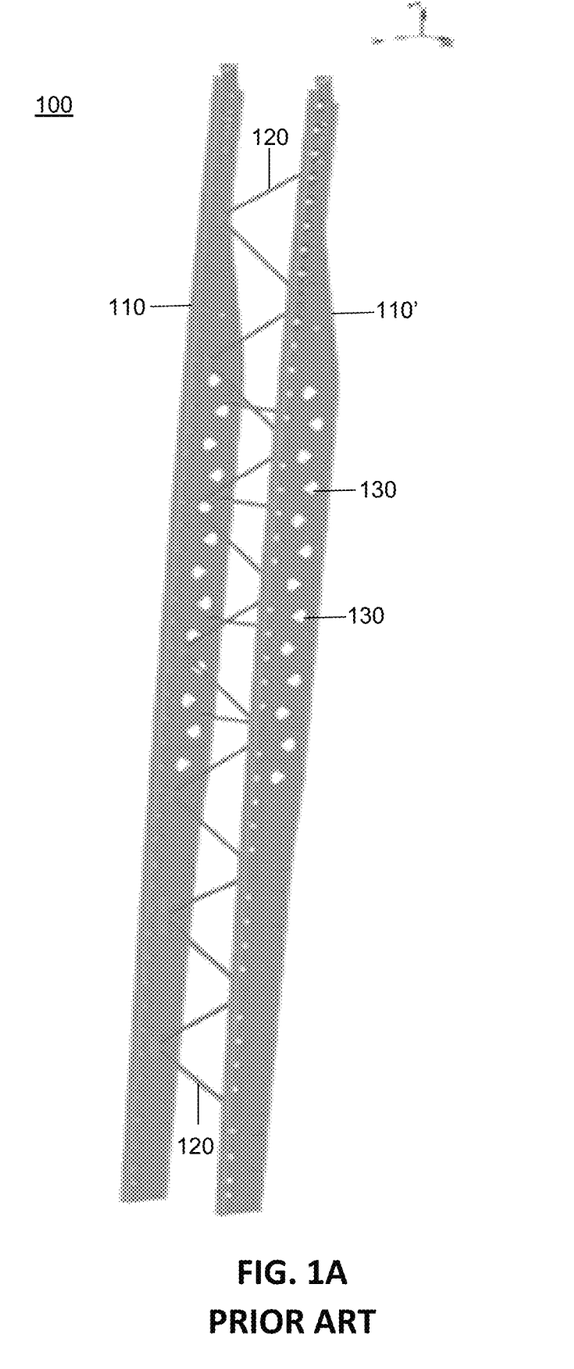
FIG. 1A is a top perspective view and FIG. 1B is a side view of an exemplary beam assembly of the prior art.
Figure 1B:
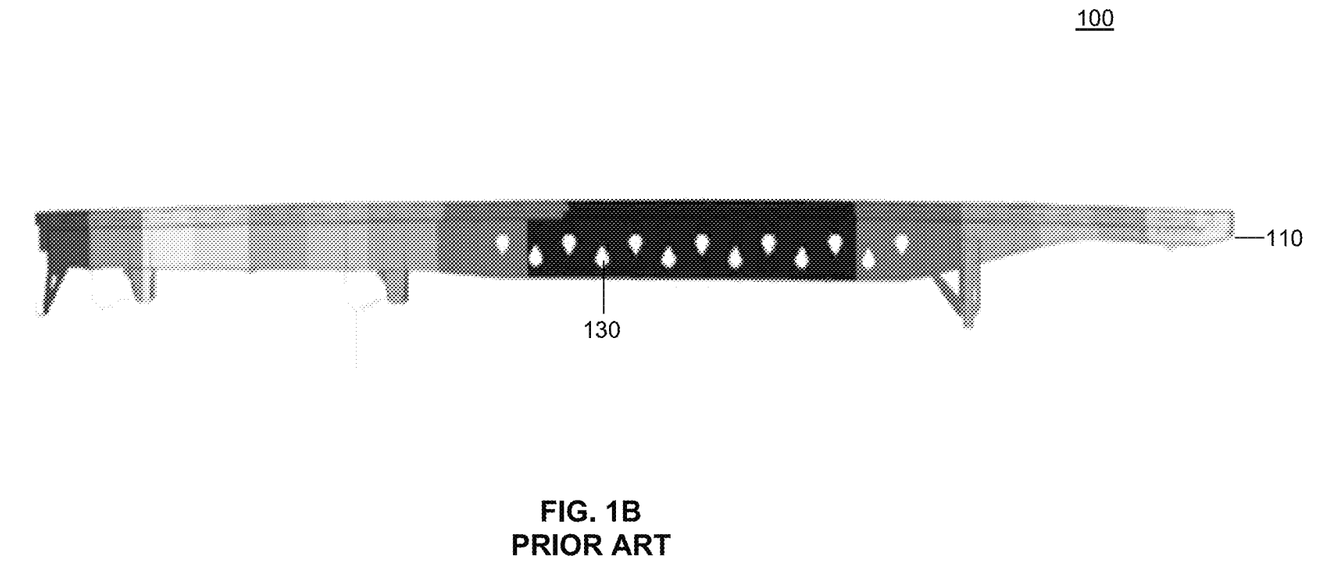

FIG. 1 shows an exemplary beam assembly 100 of the prior art. Two longitudinal beams 110, 110' are shown, provided with transversal members 120 therebetween. In the embodiment shown in the figures, small openings 130 are shown on the beams 110, 110', but the beams 110, 110' are mostly solid. However, it should be noted that the beam assembly 100 is an exemplary prior art used for the purpose of comparison below. It should be understood that although FIG. 1 shows an exemplary beam assembly, the skilled person will appreciate that the beam assembly 100 may be used in the manufacture of a truck trailer of various configurations.

Figure 2A:
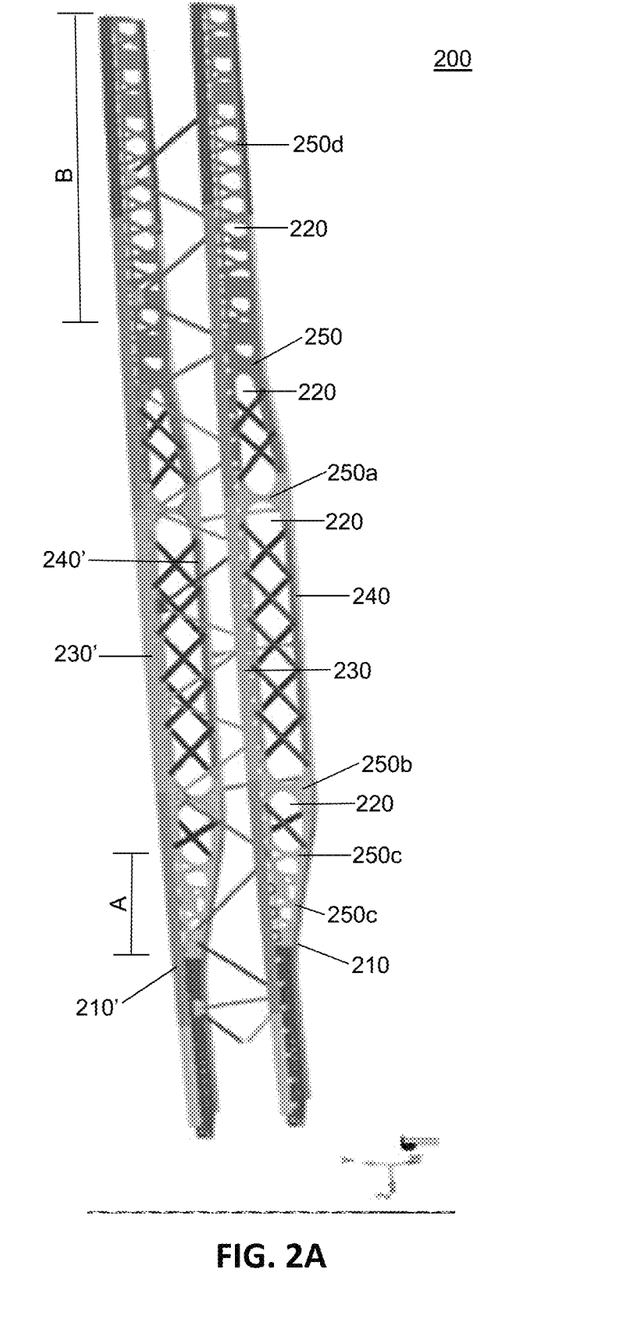
FIG. 2A is a top perspective view and FIG. 2B is a side view of a light-weight beam assembly according to one embodiment.
Figure 2B:
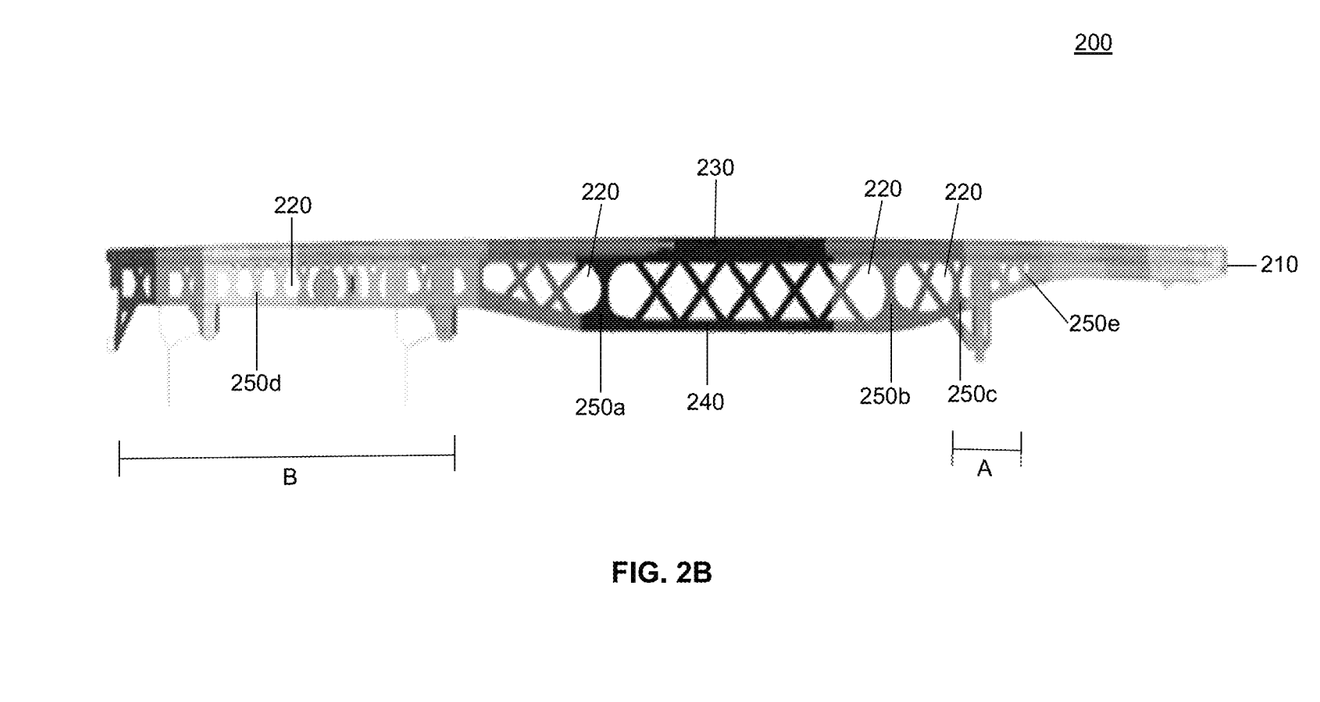

Referring now to FIG. 2, a light-weight beam assembly 200 according to one embodiment is shown. In the embodiment shown, the assembly 200 includes two longitudinal beams 210, 210' provided with cutouts 220 which have been cut through the beams 210, 210'. Cutouts of various shape and dimensions may be included and it should be noted that the cutouts 220 shown on the figures represent an exemplary configuration according to one embodiment.

In this embodiment, the cutouts 220 extend vertically from an upper portion 230, 230' to a lower portion 240, 240' of the beams 210, 210' respectively, and longitudinally over a length of the beams 210, 210'. The length may be different for at least one cutout. In some embodiments, each cutout may extend over a different length of the beams. Two adjacent cutouts may be defined by a supporting member 250 integrally formed within the beams. It should be understood that the supporting members may have different shapes, dimensions and locations on the beams depending on the shape and dimensions of the cutouts. In this embodiment, three supporting members 250a, 250b and 250c having an I-shape are shown. In portions A and B of the beams, multiple smaller cutouts define X-shape supporting members 250d, or irregular shaped supporting members 250e.

The skilled person would appreciate that cutouts may have the shape of an ellipse, a circle, a rectangle, a square, a hexagon, a pentagon. The supporting members thus defined by the cutouts may be I-shaped, T-shaped, X-shaped, Y-shaped. Cutouts contribute to lowering the weight of the assembly and may thus be selected to achieve various weight diminution, while keeping a balance with supporting members which contribute to maintain the resistance and stiffness of the beam assembly.

In some embodiments, 2, 3, 4 or 5 large cutouts are present, and a plurality of smaller cutouts may be present. In some embodiments, the smaller cutouts are present near the front and near the rear of the beam assembly as described above. Amongst the large cutouts, in some embodiments, a first cutout (main cutout) may extend from a point at about ¼ to about ⅓ of the length of the beam from the front, to a point at about ½ to about ⅔ of the length of the beam from the front. As such, a main cutout may extend through about ⅙ to about ⅖ of the total length the beam. A second cutout may extend from a point at about ½ to about ⅔ of the length of the beam from the front, to a point at about ⅔ to about ¾ of the length of the beam from the front. As such, a second cutout may extend through up to about ¼ of the total length the beam. A third cutout may extend from a point at about ⅕ of the length of the beam from the front, to a point at about ⅓ of the length of the beam from the front. As such, a third cutout may extend through up to about ⅙ of the total length the beam.

Accordingly, in some embodiments, the supporting members defining the cutouts as described above may be positioned, at their center, at a point at about ⅕ of the length of the beam from the front, at a point at about ¼ to about ⅓ of the length of the beam from the front, at a point at about ½ to about ⅔ of the length of the beam from the front, or at a point at about ⅔ to about ¾ of the length of the beam from the front.

The trailer may be unpowered to be towed by a powered vehicle through means known in the art. Optionally, it may be fully integrated with the powered vehicle, for example to provide a flatbed truck.

Figure 3A:
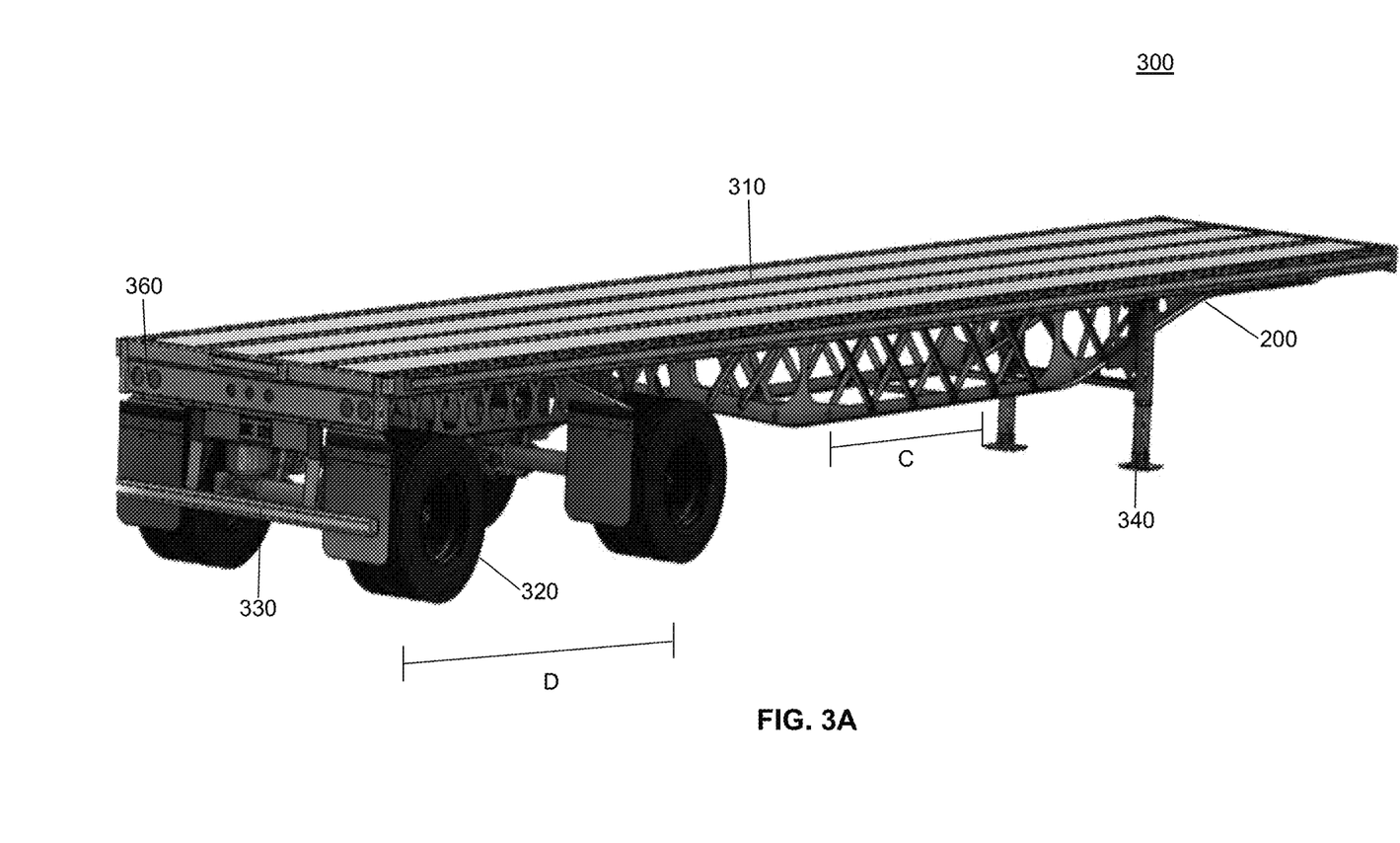
FIG. 3A is a top perspective view and FIG. 3B is a side view of a truck trailer using the light-weight beam assembly according to one embodiment.
Figure 3B:
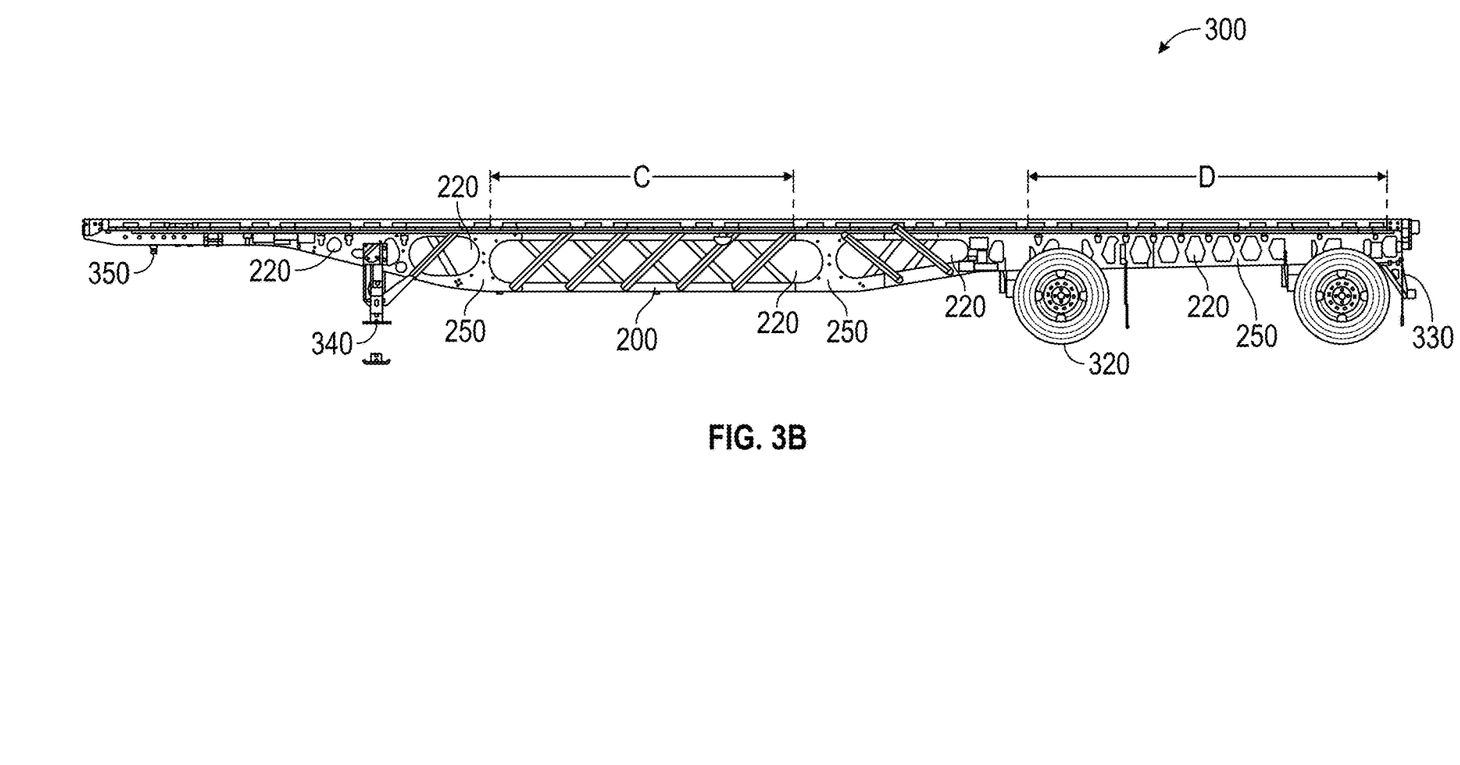

Light-weight beam assembly 200 may be used to manufacture a truck trailer. For instance, light-weight beam assembly 200 may be used as the main frame for a truck trailer 300, such as but not limited to a flatbed trailer as shown in FIG. 3. FIGS. 3A and 3B show a light-weight beam assembly 200 supporting a platform or bed 310 of a flatbed trailer. The flatbed trailer is provided with wheel assembly 320 for providing movement of the trailer. Other exemplary parts typically used in the art, such as bumper 330, landing gear 340, hitch means 350, lights 360, are shown but will not be described herein. It should be understood that any suitable parts known in the art and various suitable configurations on the trailer may be used.

Figure 4A:
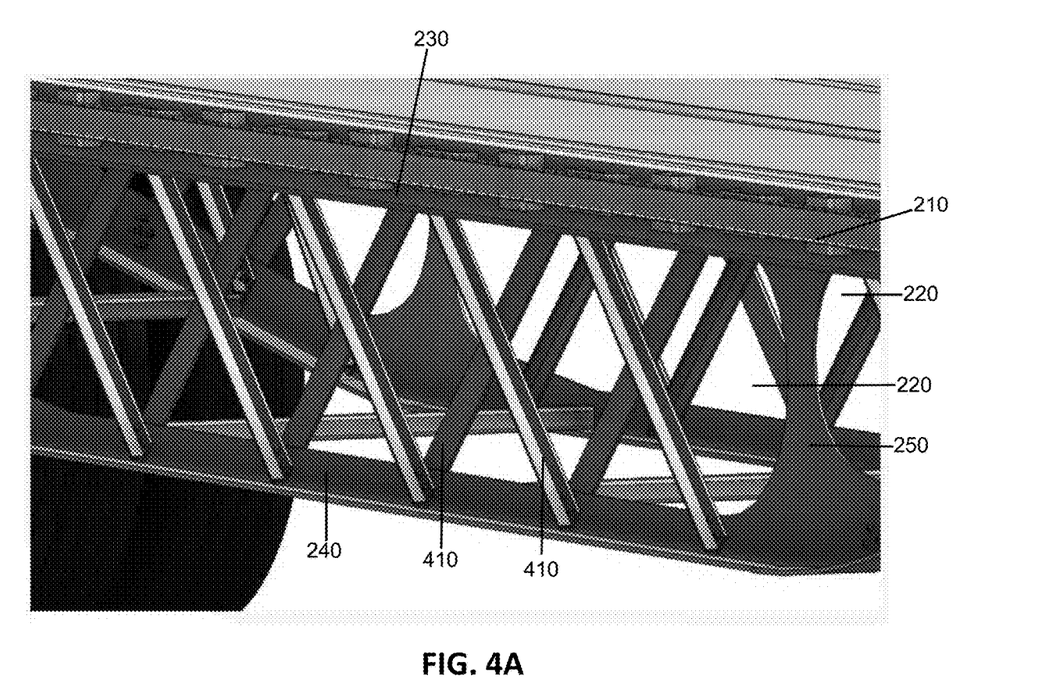
FIG. 4A is a perspective view of a portion A of the truck trailer of FIG. 3B
Figure 4B:
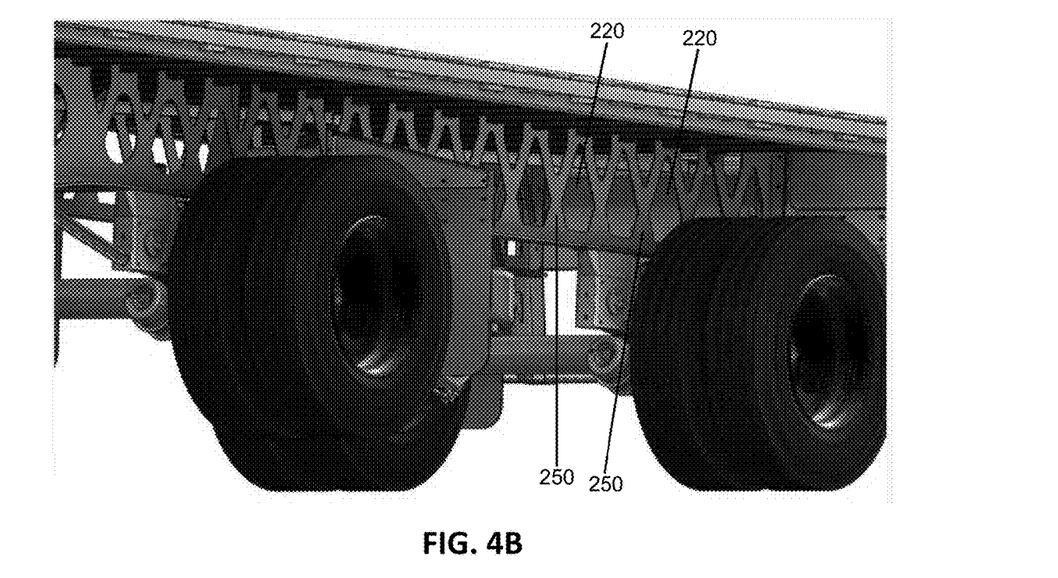
FIG. 4B is a perspective view of a portion A of the truck trailer of FIG. 3A.

Specific enlarged views of portions of the truck trailer of FIG. 3A are shown in FIG. 4. Specifically, FIG. 4A shows portion C as identified in FIGS. 3A and 3B, and FIG. 4B shows portion D as identified in FIGS. 3A and 3B. In FIG. 4A, beam 210 is shown provided with cutout 220. A supporting member 250 defining two adjacent cutouts 220 is shown. A plurality of reinforcement members 410, attached to the upper portion 230 of the beam at one end and to the lower portion 240 of the beam at the other end are also shown. Reinforcement members 410 extending transversally across the cutout form x-crosses. Reinforcement members 410 may be provided across the whole length of the cutout as shown in FIG. 4A. FIG. 4B shows a portion of the beam being provided with cutouts 220, defining supporting members 250 but no reinforcement members. Typically, such configuration using multiple smaller cutouts 220 defining multiple corresponding X-shaped supporting members 250 may be present at the rear of the trailer where wheel assemblies are usually disposed or at the front of the trailer where landing gear may be provided.

The beams may be made of steel or aluminum, or any suitable material know in the art. The cutouts may be cut through the beams, for example, through laser cutting, plasma cutting, die punching or embossed.

The reinforcement members and the transversal members may be made of aluminum, stainless steel, steel, carbon fiber or fiber glass.

In some embodiments, the weight reduction of the truck trailer may be from about 15% to about 25%. In the embodiments shown in the drawings, the weight reduction of the truck trailer may be about 20%, compared to an exemplary trailer of the prior art, as confirmed by the results outlined in the test section below. For example, a typical truck trailer with similar dimensions has a weight of 3300 kg. In some embodiments, the total weight of the truck trailer is from about 2000 kg to about 3000 kg. In some embodiments, the total weight of the truck trailer is from about 2000 kg to about 2800 kg. In some embodiments, the total weight of the truck trailer is from about 2000 kg to about 2500 kg.

In some embodiments, the total length to the truck trailer of the present application is from about 36 ft (10.1 m) to about 60 ft (18.3 m). In some embodiments, the total length to the truck trailer of the present application is from about 36 ft (10.1 m) to about 50 ft (15.2 m). In some embodiments, the total length to the truck trailer of the present application is from about 40 ft (12.2 m) to about 50 ft (15.2 m). In some embodiments, the total length to the truck trailer of the present application is from about 5 m to about 25 m. In some embodiments, the total length to the truck trailer of the present application is from about 10 m to about 18 m. In some embodiments, the total length to the truck trailer of the present application is from about 14 m to about 17 m or about 14.6 m to about 16.2 m.

In some embodiments shown in FIGS. 5A and 5B, the load support over the total length of the truck trailer is at least 90%. For example, the vertical deformation of the beam assembly is less than 4 inches (10.2 cm) when a load of about 50,000 pounds is distributed over a length of about 4 ft (22680 kg/1.2 m) and disposed at about a center position (about 24 ft-7.3 m—from the front) along the length of the beam assembly, compared to a point zero with no load. As shown on FIG. 5C, the load may be distributed over a length $L^1$ or $L^2$ at about the center ($T^c$) of the total longitudinal length T. As such, the vertical deformation may be from about 0.5% to about 10%, or from about 2% to about 10%. In some embodiments, the vertical deformation is from about 5% to about 10%. In some embodiments, the vertical deformation is from about 5% to about 7%.

In some embodiments, the vertical deformation of the beams receiving a load is from about 0.5% to about 10%, from about 2% to about 10%, from about 5% to about 10%, or from about 5% to about 7%, wherein the load is distributed as shown in FIG. 5A. In some embodiments, the vertical deformation of the beams receiving a load is less than about 10%, wherein the load is from about 20,000 kg to about 24,000 kg distributed over a length of from about 500 cm to about 750 cm at about the center of the beams, i.e. the center of the length is at about the center of the beams. In some embodiments the load is from about 21,000 kg to about 23,000 kg. In some embodiments, the load is from 21,500 kg to about 22,500 kg. In some embodiments, the load is distributed over a length of from about 550 cm to about 700 cm. In some embodiments, the load is distributed over a length of from about 575 cm to about 675 cm.

In some embodiments, the vertical deformation of the beams receiving a load is from about 0.5% to about 10%, from about 2% to about 10%, from about 5% to about 10%, or from about 5% to about 7%, wherein the load is distributed as shown in FIG. 5B. In some embodiments, the load is from about 20,000 kg to about 24,000 kg distributed over a length of from about 275 cm to about 450 cm at the center of the beams, i.e. the center of the length is at the center of the beams. In some embodiments the load is from about 21,000 kg to about 23,000 kg. In some embodiments, the load is from 21,500 kg to about 22,500 kg. In some embodiments, the load is distributed over a length of 300 cm to 425 cm. In some embodiments, the load is distributed over a length of 325 cm to 400 cm.

Figure 5C:
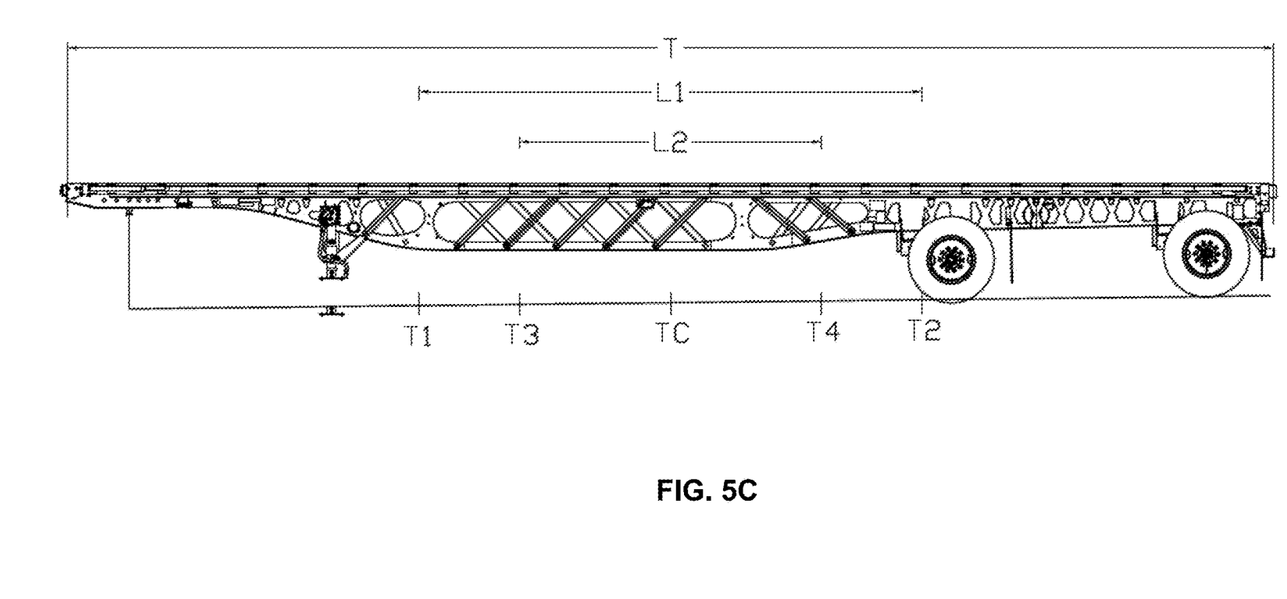

In some embodiments, the load is distributed over a length $L^1$ as shown on FIG. 5C. In some embodiments, the load is distributed over a length $L^2$ as shown on FIG. 5C. In some embodiments, the length $L^1$ may extend from a point at about $T^1$ at about ¼ of the total length from the front to a point $T^2$ at about ¾ of the total length from the front. In some embodiments, the length $L^2$ may extend from a point at about $T^3$ at about ⅓ of the total length from the front to a point $T^4$ at about ⅔ of the total length from the front.

It will be appreciated that the above-described loads are used for the purpose of assessing vertical deformation and thus resistance of the truck trailer of the present application. On regular use, the loads carried by a truck trailer of the present disclosure will be distributed according to needs, constructor's recommendations, local regulations, etc. and will not be limited to the described loads.

It will be understood that the vertical deformation may be measured by any know methods for determining relative position or a change in position. For example, a sensor, strings, a laser, an optical imaging system, an ultrasound system or the like, may be used at various positions of the trailer and this is well within the purview of a skilled person in the art.

Tests

Resistance tests have been conducted using an exemplary truck trailer according to an embodiment of the present application, as shown in FIGS. 5A and 5B. Vertical deformation were measured and compared to a point zero, i.e. without load. A tight string has been installed on each side of the trailer to take the measurements of distances between the stretched twine and the trailer at predetermined positions. Twenty-five (25) pockets of 4 inches (10.2 cm) on each side of the trailer were used as a reference point for measurements. Measurements were taken on the lower back corner of the pockets. The measurements were taken with the trailer resting on a pivot trestle designed to simulate a truck fifth wheel with a height of 48 inches (122 cm) from the ground.

Loading conditions are described below. Two (2) types of loads were used, as illustrated in FIGS. 5A and 5B:
1) Reference, NO LOAD;
2) LOAD 1: Eleven (11) concrete blocks of 4400 pounds each (1996 kg), distributed over 20 ft (6.1 m) as shown in FIG. 5A;
3) LOAD 2: Eleven (11) concrete blocks of 4400 pounds each (1996 kg), distributed over 12 ft (3.7 m) as shown in FIG. 5B.

The loads were applied on approximate marks on the trailer platform. The loads are distributed such that they do not contribute to the stiffness of the trailer.

Results

The vertical deformation results for LOAD 1 are shown below in Table 1. The measures are in inches. Results shown in Line 1 are measurements on the conductor side of the truck trailer and results shown in Line 2 are measurements on the passenger side of the truck trailer The maximal vertical deformation measured was 3.00 inches (7.6 cm) (in bold).

TABLE 1

Vertical deformation measurements for LOAD 1

| | Pocket # | 1 | 2 | 3 | 4 | 5 | 6 | 7 | 8 | 9 | 10 | 11 | 12 | 13 |
|---|---|---|---|---|---|---|---|---|---|---|---|---|---|---|
| No LOAD | 1 | 0 | 0.25 | 1.125 | 1.75 | 2.375 | 2.875 | 3.25 | 3.625 | 3.75 | 4 | 4.125 | 4.188 | 4.313 |
| | 2 | 0 | 0.125 | 1 | 1.125 | 2.25 | 2.75 | 3.25 | 3.625 | 3.938 | 4.125 | 4.188 | 4.25 | 4.25 |
| LOAD 1 | 1 | 0 | 0.063 | 0.438 | 0.625 | 0.75 | 1 | 1.063 | 1.188 | 1.25 | 1.25 | 1.25 | 1.25 | 1.313 |
| | 2 | 0 | 0 | 0.25 | 0.625 | 0.875 | 1.125 | 1.375 | 1.5 | 1.625 | 1.688 | 1.625 | 1.625 | 1.625 |
| Calculated | 1 | 0 | −0.19 | −0.69 | −1.13 | −1.63 | −1.88 | −2.19 | −2.44 | −2.5 | −2.75 | −2.88 | −2.94 | −3.00 |
| deformation | 2 | 0 | −0.13 | −0.75 | −0.50 | −1.38 | −1.63 | −1.88 | −2.13 | −2.31 | −2.44 | −2.56 | −2.63 | −2.63 |

| | Pocket # | 14 | 15 | 16 | 17 | 18 | 19 | 20 | 21 | 22 | 23 | 24 | 25 |
|---|---|---|---|---|---|---|---|---|---|---|---|---|---|
| No LOAD | 1 | 4.25 | 4.188 | 4 | 3.75 | 3.5 | 3.25 | 2.75 | 2.25 | 1.875 | 1.313 | 0.688 | 0.063 |
| | 2 | 4.125 | 4.063 | 3.875 | 3.688 | 3.438 | 3.125 | 2.813 | 2.375 | 1.875 | 1.375 | 0.75 | 0 |

TABLE 1-continued

| | | \multicolumn{12}{c|}{Vertical deformation measurements for LOAD 1} |
|---|---|---|---|---|---|---|---|---|---|---|---|---|---|
| LOAD 1 | 1 | 1.25 | 1.25 | 1.25 | 1.188 | 1.125 | 1.063 | 1 | 0.875 | 0.75 | 0.5 | 0.313 | 0 |
| | 2 | 1.5 | 1.5 | 1.375 | 1.375 | 1.25 | 1.25 | 1.125 | 1.063 | 0.875 | 0.75 | 0.375 | 0 |
| Calculated | 1 | −3.00 | −2.94 | −2.75 | −2.56 | −2.38 | −2.19 | −1.75 | −1.38 | −1.13 | −0.81 | −0.38 | −0.06 |
| deformation | 2 | −2.63 | −2.56 | −2.50 | −2.31 | −2.19 | −1.88 | −1.69 | −1.31 | −1.00 | −0.63 | −0.38 | 0.00 |

The vertical deformation results for LOAD 2 are shown below in Table 2. Results are presented as explained above. The maximal vertical deformation measured was 3.25 inches (8.3 cm) (in bold).

TABLE 2

| | | \multicolumn{13}{c|}{Vertical deformation measurements for LOAD 2} |
|---|---|---|---|---|---|---|---|---|---|---|---|---|---|
| Pocket # | | 1 | 2 | 3 | 4 | 5 | 6 | 7 | 8 | 9 | 10 | 11 | 12 | 13 |
| No LOAD | 1 | 0 | 0.25 | 1.125 | 1.75 | 2.375 | 2.875 | 3.25 | 3.625 | 3.75 | 4 | 4.125 | 4.188 | 4.313 |
| | 2 | 0 | 0.125 | 1 | 1.125 | 2.25 | 2.75 | 3.25 | 3.625 | 3.938 | 4.125 | 4.188 | 4.25 | 4.25 |
| LOAD 2 | 1 | 0 | 0 | 0.375 | 0.563 | 0.813 | 0.938 | 1.063 | 1.125 | 1.125 | 1.125 | 1 | 1 | 1.063 |
| | 2 | 0 | 0.313 | 0.563 | 0.875 | 1.063 | 1.25 | 1.5 | 1.5 | 1.5 | 1.5 | 1.5 | 1.438 |
| Calculated | 1 | 0 | −0.25 | −0.75 | −1.19 | −1.56 | −1.94 | −2.19 | −2.50 | −2.63 | −2.88 | −3.13 | −3.19 | −3.25 |
| deformation | 2 | 0 | −0.13 | −0.69 | −0.56 | −1.38 | −1.69 | −2.00 | −2.13 | −2.44 | −2.63 | −2.69 | −2.75 | −2.81 |

| | | 14 | 15 | 16 | 17 | 18 | 19 | 20 | 21 | 22 | 23 | 24 | 25 |
|---|---|---|---|---|---|---|---|---|---|---|---|---|---|
| Pocket # | | | | | | | | | | | | | |
| No LOAD | 1 | 4.25 | 4.188 | 4 | 3.75 | 3.5 | 3.25 | 2.75 | 2.25 | 1.875 | 1.313 | 0.688 | 0.063 |
| | 2 | 4.125 | 4.063 | 3.875 | 3.688 | 3.438 | 3.125 | 2.813 | 2.375 | 1.875 | 1.375 | 0.75 | 0 |
| LOAD 2 | 1 | 1.063 | 1.063 | 1.063 | 1 | 1 | 0.938 | 0.875 | 0.75 | 0.625 | 0.438 | 0.313 | 0 |
| | 2 | 1.313 | 1.25 | 1.25 | 1.188 | 1.125 | 1.125 | 1.063 | 1 | 0.813 | 0.388 | 0.375 | 0 |
| Calculated | 1 | −3.19 | −3.13 | −2.94 | −2.75 | −2.50 | −2.31 | −1.88 | −1.50 | −1.25 | −0.88 | −0.38 | −0.06 |
| deformation | 2 | −2.81 | −2.81 | −2.63 | −2.50 | −2.31 | −2.00 | −1.75 | −1.38 | −1.06 | −0.69 | −0.38 | 0.00 |

It can be seen from the above results that the vertical deformation is less than about 7% (3.25 inches of 48 inches-8.3 cm of 122 cm)), highlighting the high performance and load resistance of the light-weight beam assembly and truck trailer of the present application.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

What is claimed is:

1. A light-weight truck trailer comprising:
two longitudinal beams, each beam being a single unitary continuous piece comprising at least two cutouts cut through the single unitary continuous piece, wherein each of the cutouts independently extend vertically from an upper portion to a lower portion of the beam and extend longitudinally over a length of the beam, and wherein the at least two cutouts are defined within the single unitary continuous piece by at least one vertically extending supporting member;
a plurality of reinforcement members, each reinforcement member being connected to one of the two beams, from one end at the upper portion of the beam and from the other end at the lower portion of the beam so that the reinforcement member extends transversally across one of the cutouts,
wherein at least one of the cutouts extends longitudinally over a length of the beam, from a point at about ¼ to about ⅓ from a front end of the beam, to a point at about ½ to about ⅔ from the front end; and
wherein two reinforcement members overlap at their center to form a x-cross.

2. The truck trailer of claim 1, wherein the at least two cutouts each independently have the shape of: an ellipse, a circle, a rectangle, a square, a hexagon, or a pentagon.

3. The truck trailer of claim 1, wherein 2, 3, 4, or 5 large cutouts are present.

4. The truck trailer of claim 3, wherein at least one of the large cutouts extends longitudinally over a length of the beam, from a point at about ½ to about ⅔ from the front end to a point at about ⅔ to about ¾ from the front end.

5. The truck trailer of claim 3, wherein at least one of the large cutouts extends longitudinally over a length of the beam, from a point at about ⅕ of the length of the beam from the front end, to a point at about ⅓ of the length of the beam from the front end.

6. The truck trailer of claim 3, wherein at least one of the large cutouts extend longitudinally over a length of the beam, wherein the length is about ⅙ to about ⅖ of the total length of the beam.

7. The truck trailer of claim 1, wherein a plurality of small cutouts are present.

8. The truck trailer of claim 1, wherein a first cutout extends from a point at about ¼ to about ⅓ of the length of the beam from the front end, to a point at about ½ to about ⅔ of the length of the beam from the front end, a secondary cutout may extend from a point at about ½ to about ⅔ of the length of the beam from the front end, to a point at about ⅔ to about ¾ of the length of the beam from the front end and a third cutout may extend from a point at about ⅕ of the length of the beam from the front end, to a point at about ⅓ of the length of the beam from the front end.

9. The truck trailer of claim 1, wherein a plurality of x-crosses are formed by reinforcement members over the length of at least one cutout.

10. The truck trailer of claim 1, wherein the beams are formed of steel or aluminum.

11. The truck trailer of claim 1, wherein the at least one vertically extending supporting member defines an I-shape, a T-shape, a X-shape, or a Y-shape.

12. The truck trailer of claim 1, wherein the at least one vertically extending supporting member defines an I-shape.

13. The truck trailer of claim 12, wherein the at least one vertically extending supporting member is positioned, at its center, at a point at about ¼ to about ⅓ of the length of the beam from the front end.

14. The truck trailer of claim 1, wherein the at least one vertically extending supporting member is positioned, at its center, at a point at about ½ to about ⅔ of the length of the beam from the front end.

15. The truck trailer of claim 1, wherein the at least one vertically extending supporting member is positioned, at its center, at a point at about ⅔ to about ¾ of the length of the beam from the front end.

16. The truck trailer of claim 1, wherein a plurality of vertically extending supporting members are present and are each independently positioned, at their respective center, at a point at about ⅕ of the length of the beam from the front end, at a point at about ¼ to about ⅓ of the length of the beam from the front end, at a point at about ½ to about ⅔ of the length of the beam from the front end, and at a point at about ⅔ to about ¾ of the length of the beam from the front end.

17. The truck trailer of claim 1, wherein the reinforcement members are made of aluminum, stainless steel, steel, carbon fiber, or fiber glass.

18. The truck trailer of claim 1, wherein the configuration of the two beams are identical.

19. The truck trailer of claim 1, further comprising a plurality of transversal members, each transversal member being connected:
- at one end to the upper portion of one of the two beams and at the other end to the upper portion of the other of the two beams, or
- at one end to the lower portion of one of the two beams and at the other end to the lower portion of the other of the two beams.

20. The truck trailer of claim 1, wherein the total weight of the truck trailer is from about 2000 kg to about 2500 kg.

21. The truck trailer of claim 20, wherein the total length of the truck trailer is from about 14 m to about 17 m or about 14.6 m to about 16.2 m.

22. The truck trailer of claim 1, wherein the vertical deformation of the beams receiving a load is from about 2% to about 10%, wherein the load is from about 20,000 kg to about 24,000 kg distributed over a length of from about 500 cm to about 750 cm at the center of the beams.

* * * * *